US006038296A

United States Patent [19]
Brunson et al.

[11] Patent Number: 6,038,296
[45] Date of Patent: Mar. 14, 2000

[54] INTERNET/INTRANET USER INTERFACE TO A MULTIMEDIA MESSAGING SYSTEM

[75] Inventors: Gordon R. Brunson, Broomfield; Robert M. Klein, Denver, both of Colo.

[73] Assignee: Lucent Technologies Inc., Murray Hill, N.J.

[21] Appl. No.: 08/946,511

[22] Filed: Oct. 7, 1997

[51] Int. Cl.[7] .......................... H04M 11/00; H04M 1/64
[52] U.S. Cl. ..................... 379/100.11; 709/204
[58] Field of Search ........................... 379/100.11, 88.13, 379/71, 84, 88.23; 455/15; 707/10, 2, 3, 5; 395/500; 709/204

[56] References Cited

U.S. PATENT DOCUMENTS

| | | | |
|---|---|---|---|
| 5,392,336 | 2/1995 | Chang | 379/100.11 |
| 5,724,406 | 3/1998 | Juster | 379/88.13 |
| 5,742,668 | 4/1998 | Pepe et al. | 455/415 |
| 5,768,513 | 6/1998 | Kuthyar et al. | 395/200.34 |
| 5,826,269 | 10/1998 | Hussey | 707/10 |
| 5,870,549 | 2/1999 | Bobo | 348/14 |

FOREIGN PATENT DOCUMENTS

| | | | |
|---|---|---|---|
| 9620553 | 7/1996 | WIPO | H04M 3/50 |
| 9637989 | 11/1996 | WIPO | H04M 3/50 |

OTHER PUBLICATIONS

*Supercharging the Web with Computer Telephony*, Computer Telephony, vol. 4, Issue 3, Mar. 1996, pp. 170–196 (18 pages).

*Nexpath's Java Small Office Phone System*, Teleconnect, vol. 15, Issue 6, Jun. 1997, p. 27.

Fiszer, Max,*ResumeRouting and Mass Customization in the Call Center*, Telecom Library (supplement), Sep. 1996, pp. 11–13.

Cole, B., *Big Changes Ahead for Chameleon Mail Client*, Network World, Jul. 15, 1996, pp. 33, 35.

Cox, John, *Development Tool Kits Link the Web with Back-–end Data*, Network World, Jun. 24, 1996, vol. 13, No. 26, pp. 39, 41.

Allen, B., *Traveling the Information Highway*, The Institute, vol. 20, No. 2, Feb. 1996, p. 4.

U. S. Patent Application, Concepcion 1–3–1–2–4–3–2–3, Ser. #08/574419, "Guest Mail: Communicating Electronic Messages Between Disparate Messaging Systems", Filed Dec. 15, 1995.

*Primary Examiner*—Zarni Maung
*Assistant Examiner*—Khanh Quang Dinh
*Attorney, Agent, or Firm*—David Volejnicek

[57] ABSTRACT

An Internet/intranet-based arrangement for interaction between a messaging system and a message originator and delivery of the message originator's message to a mailbox of the messaging system uses TCP/IP communications applications such as HTTP, Telnet, FTP, or Chat as information-transfer and message delivery mechanisms, creating an Internet/intranet-based text, binary, video, and/or multimedia file message-delivery analogue to the call-answer message-creation capability of telephony-based messaging systems.

11 Claims, 5 Drawing Sheets

INTERNET/INTRANET USER INTERFACE TO A MULTIMEDIA MESSAGING SYSTEM

TECHNICAL FIELD

This invention relates to electronic messaging.

BACKGROUND OF THE INVENTION

Voice messaging systems have long provided the service of accepting and recording voice messages for subscribers from impromptu callers. In these systems, message origination is not restricted to subscribers of these messaging systems or to subscribers of remote messaging systems that are networked with these systems; rather, any caller can originate a message. As voice messaging and e-mail systems become integrated into multimedia messaging systems, it becomes desirable to extend the call-answer capability of voice messaging systems to text messages and other message-media besides voice, and to make this capability available to substantially any and all possible message originators, without pre-subscription and without preference or deference to the computer operating system of the originator.

One promising opportunity is to use platform-independent TCP/IP (transmission control protocol/Internet protocol) applications or platform-independent Web browsers and the growing community of TCP/IP and Web users to provide the connectivity infrastructure that is needed to deliver new types of electronic media directly into the mailboxes of a multimedia messaging system. The TCP/IP is the standard protocol suite of the Internet. Because of the Internet's popularity, TCP/IP applications have been written and are being distributed for essentially all major computer operating systems. Of specific interest are the FTP (file transfer protocol) protocol which allows the simple transfer of files between computers, Telnet which supports terminal emulation and login to host capabilities, and Chat which is a simple split-screen two-way text interface application that allows two people to type to each other simultaneously. Similarly, Web services on the Internet are being marketed and supported as a non-subscriber-based global information-distribution mechanism. Because of its popularity, Web browser applications have been written and are being distributed for essentially all major computer operating systems. These TCP/IP applications and Web browsers therefore provide a widespread infrastructure for text, binary, and other media message delivery.

Conventional Web integrations with mailboxes focus on retrieval of messages, where the mailbox is owned and the messages are retrieved by the message recipient who typically already has a mailbox user-interface application which has capabilities preferable to those provided by a Web browser. But such integrations do not benefit a message originator who has the ability to send full multimedia messages and who is not a subscriber to the messaging system. Some existing Web browser applications do include the ability to send e-mail. But this is done via the standard e-mail SMTP protocol which inherently has the disadvantages of requiring an affiliation with an SMTP server to fulfill the e-mail delivery request. Such an affiliation is not usually available without pre-subscription. The SMTP protocol also does not assure confirmed delivery into the recipient's mailbox.

SUMMARY OF THE INVENTION

Illustratively according to the invention, technical advance over the art is achieved by a method of and an apparatus for interaction between a messaging system and a message originator, and delivery of the message originator's message to a mailbox of the messaging system, over an Internet and/or an intranet (referred to herein as Internet/intranet for short) by using TCP/IP communications applications such as HTTP, Telnet, FTP, or Chat as information-transfer and message-delivery mechanisms. This effectively creates an Internet/intranet-based text, binary, video, and/or multimedia file message-delivery analogue to the call-answer message-creation capability of telephony-based messaging systems. This arrangement improves multimedia message delivery into mailboxes for those who do not have access to gateways which deliver messages into the messaging system. It allows message contents to be delivered without regard for the application, the messaging infrastructure platform, or the operating system. Message delivery is advantageously immediate and confirmed, and the message cannot be delayed or lost in a gateway or a store-and-forward post office.

Generally according to the invention, messaging in a communications system that comprises a user terminal and a messaging system interconnected by an Internet/intranet is effected in the following manner. A request identifying a subscriber of the messaging system is sent from the user terminal via the Internet/intranet to the messaging system. In response to receipt of the request at the messaging system, subscriber information corresponding to the identified subscriber is sent from the messaging system via the Internet/intranet to the terminal. In response to receipt of the sent subscriber information at the terminal, the sent subscriber information is presented to a user of the terminal. In response to the user providing message information at the terminal, the message information is sent from the terminal via the Internet/intranet to the messaging system. In response to receipt of the sent information at the messaging system, the message information is composed (e.g., formatted) into a message of the messaging system, and the message is stored in the messaging system in a mailbox of the identified subscriber. Messaging effected in this manner gives the Internet/intranet user—any user, irrespective of whether they are or are not a subscriber of the messaging system—an interaction and message-delivery analogue to the call-answer message-creation scheme of telephony-based messaging systems. This is particularly true when the subscriber information sent to the terminal and played to the user includes the subscriber's presently-active personal greeting. Preferably, the sending of information via the Internet/intranet is effected by using at least one of the following protocols: HTTP, FTP, Telnet, and Chat. By using these standard and widely-available TCP/IP communications mechanisms, the effected messaging is made instantly and widely accessible without change to the existing Internet/intranet infrastructure.

Also preferably, in response to the storing of the message in the messaging system, an acknowledgment thereof is sent from the messaging system via the Internet/intranet to the terminal and presented there to the user. Message delivery is thus advantageously immediately confirmed to the message sender. Further preferably, the subscriber information sent to the terminal includes a form—a Web page, for example—for filling out by the user with the message information, and sending of the message information is performed in response to the user filling out the form with the message information. The user can therefore concentrate on composing the message content without having to worry about the format of the message and about whether or not he or she has remembered to select or specify any or all variable aspects of the message.

DETAILED DESCRIPTION

Figure 1:
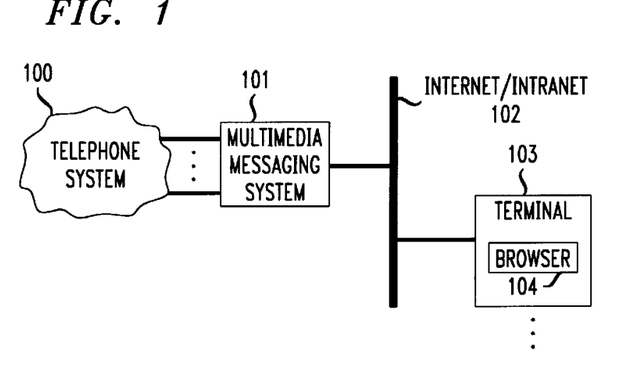
FIG. 1 is a block diagram of a communications system which implements an illustrative embodiment of the invention.

FIG. 1 shows a communications system which embodies an illustrative implementation of the invention. It comprises a multimedia messaging system 101, such as the Lucent Intuity® messaging system, which is connected by voice ports to a telephone system 100 and by a data LAN connection to an intranet and/or an Internet 102. Also connected to Internet/intranet 102 is at least one terminal 103, such as a personal computer (PC), equipped with a Web browser 104, such as a Netscape Navigator or a Microsoft Internet Explorer.

Conventionally, a user of terminal 103 communicates over Internet/intranet 102 with other terminals and with servers (not shown). If the user is a subscriber of messaging system 101, the user can also communicate with multimedia system 102 via terminal 103 equipped, for example, with a Lucent Technologies Inc. Intuity® Message Manager, to retrieve messages stored therein for the user. Also conventionally, users of telephone system 100 communicate via telephones (not shown) with multimedia messaging system 101 to deposit messages in and to retrieve messages from mailboxes of system 101. Typically, when a caller is connected to system 101, system 101 answers the call and plays to the caller a greeting—either a system greeting or a personal greeting of the called subscriber—followed by a menu of choices that are available to the caller, including the choice to record a voice message for the subscriber and store it in the subscriber's mailbox.

Figure 2:
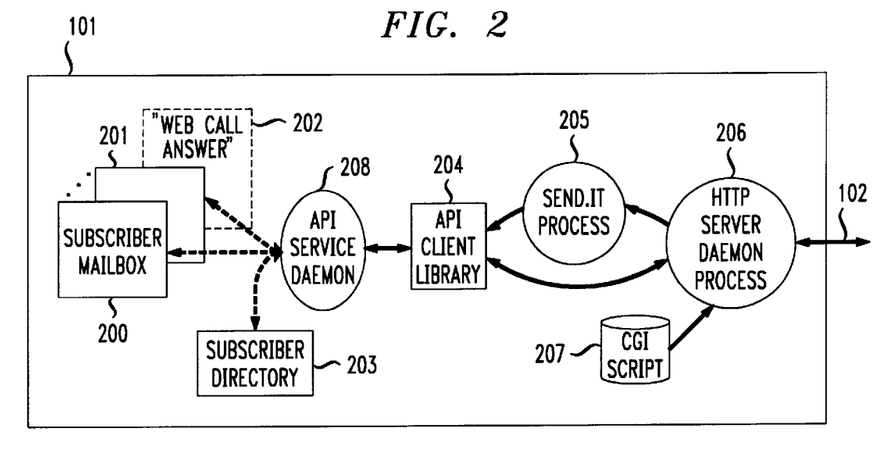
FIG. 2 is a block diagram of a first illustrative implementation of the multimedia messaging system of FIG. 1.

According to the invention, multimedia messaging system 101 provides a functionally-similar user interface to a user of terminal 103 who accesses system 101 via Internet/intranet 102 as it provides to a telephone caller who accesses system 101 via telephone system 100. System 101 is a stored-program-controlled processor system that includes various data structures and processes. As shown in FIG. 2, the data structures include conventional subscriber mailboxes 200–201 for storing of multimedia messages, and a subscriber directory 203 which stores records of information about subscribers of system 101 that may include their names, telephone numbers, subscriber IDs, personal greetings, call coverage paths, alternate contact numbers, personal calendars, personal photographs, etc. The data structures may also include a dummy mailbox 202 for a generic phantom "Web call answer" subscriber. For connection to Internet/intranet 102, system 101 includes an HTTP server daemon process 206. A daemon is a server process that runs in the background, waiting for a service request to be made by an application, and thereafter effects the service. As a part of effecting the service, the daemon may function as a client of another server. In this illustrative example, daemon process 206 is implemented as a conventional HTTP server program, such as a Netscape Communications Server or an NCSA HTTP Server, modified to implement special processing of the "~" meta-character embedded within a URL (as described below) to invoke processing of a Common Gateway Interface (CGI) script 207. Process 206 is interfaced to the data structures and to other processes of system 101 by an application program interface (API) which comprises an API client library 204 and an API service daemon 208. This interface is direct in some cases, and indirect via a send-it process 205 in other cases. In the case of system 101 being the Lucent Intuity system, API 204, 208 is the Lucent Intuity Messaging API (IMAPI).

Figure 3:
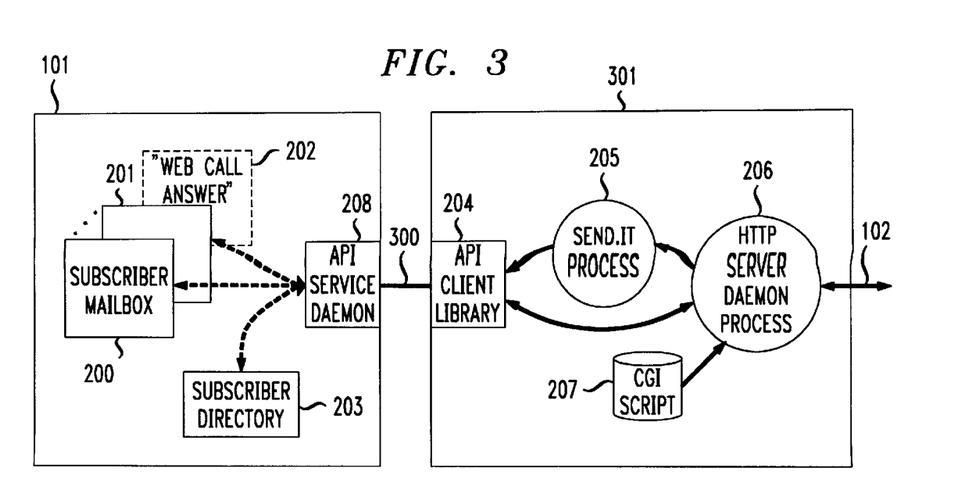
FIG. 3 is a block diagram of a second illustrative implementation of the multimedia messaging system of FIG. 1.

Alternatively, as shown in FIG. 3, system 101 may have associated with it a separate computer 301 which implements the HTTP server daemon process 206 and the send-it process 205 and acts as an Internet/intranet 102 server on behalf of system 101. API client library 204 resides on computer 301, while API service daemon 288 resides on system 101. Elements 204 and 208 communicate with each other via a conventional TCP/IP socket mechanism 300.

Figure 4:
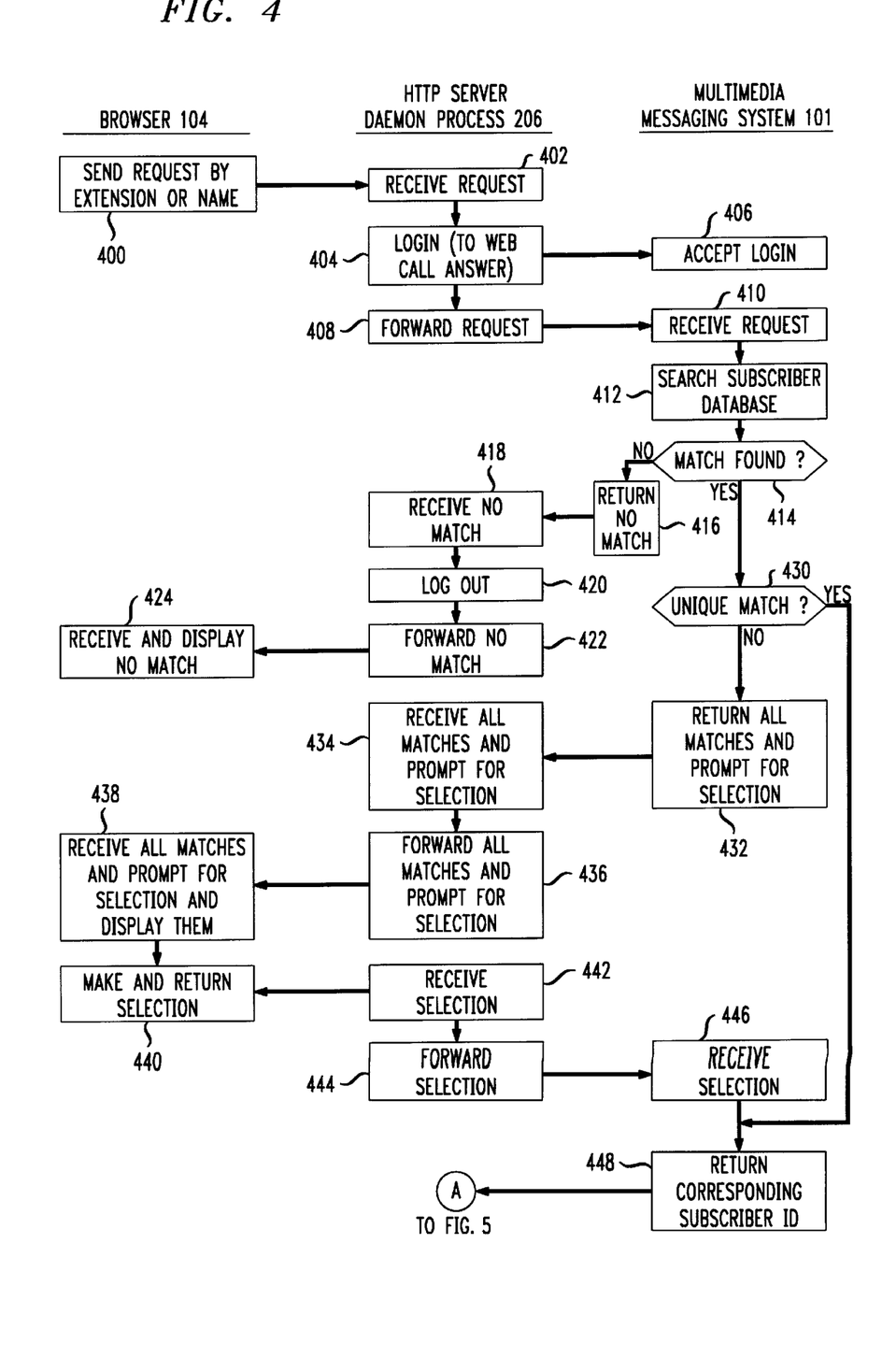
FIGS. 4–6 are a functional flow diagram of functions performed by elements of the multimedia messaging system and the terminal of FIG. 1 to effect an Internet/intranet-based call-answer-like message delivery capability within the system of FIG. 1.
Figure 5:
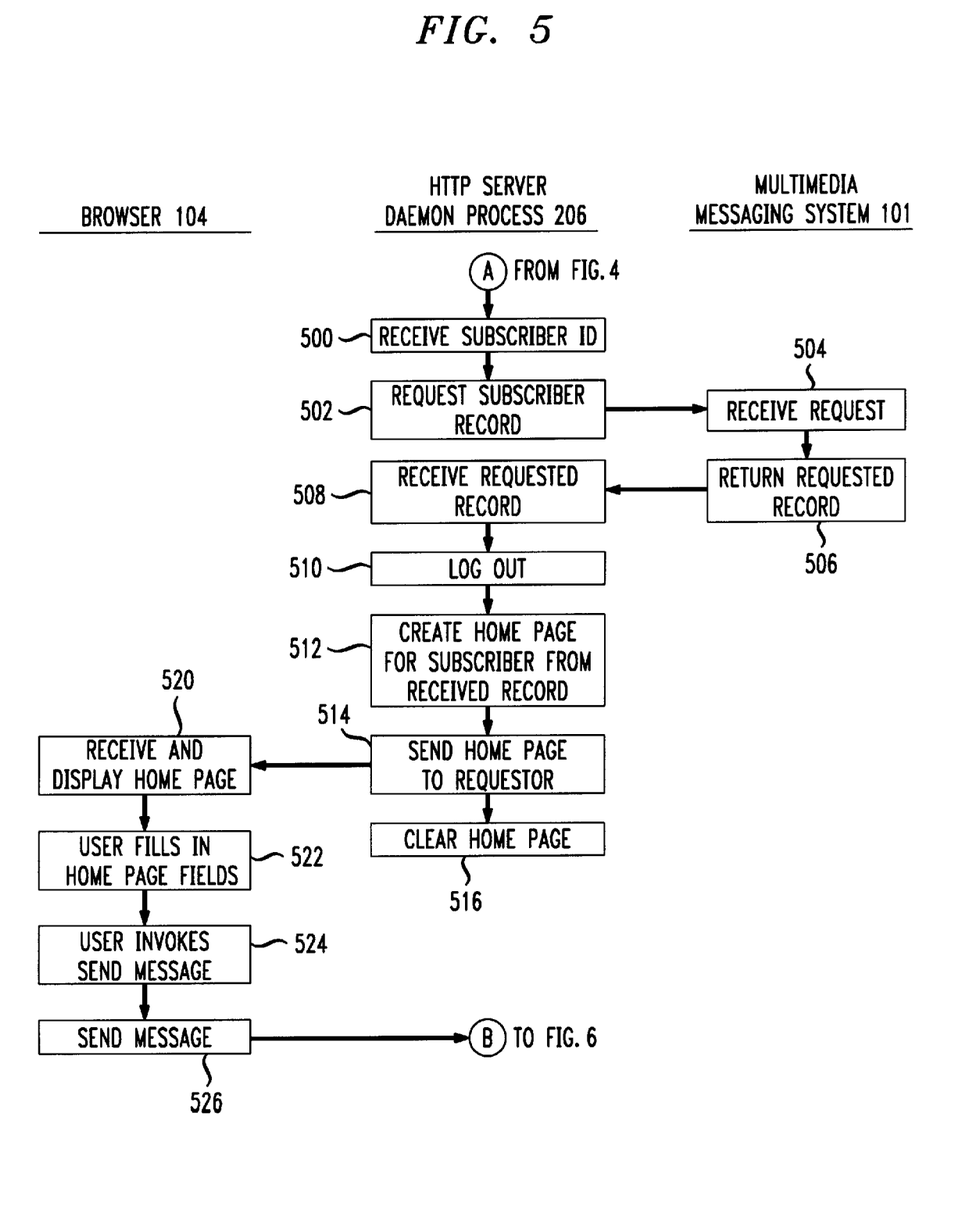
Figure 6:
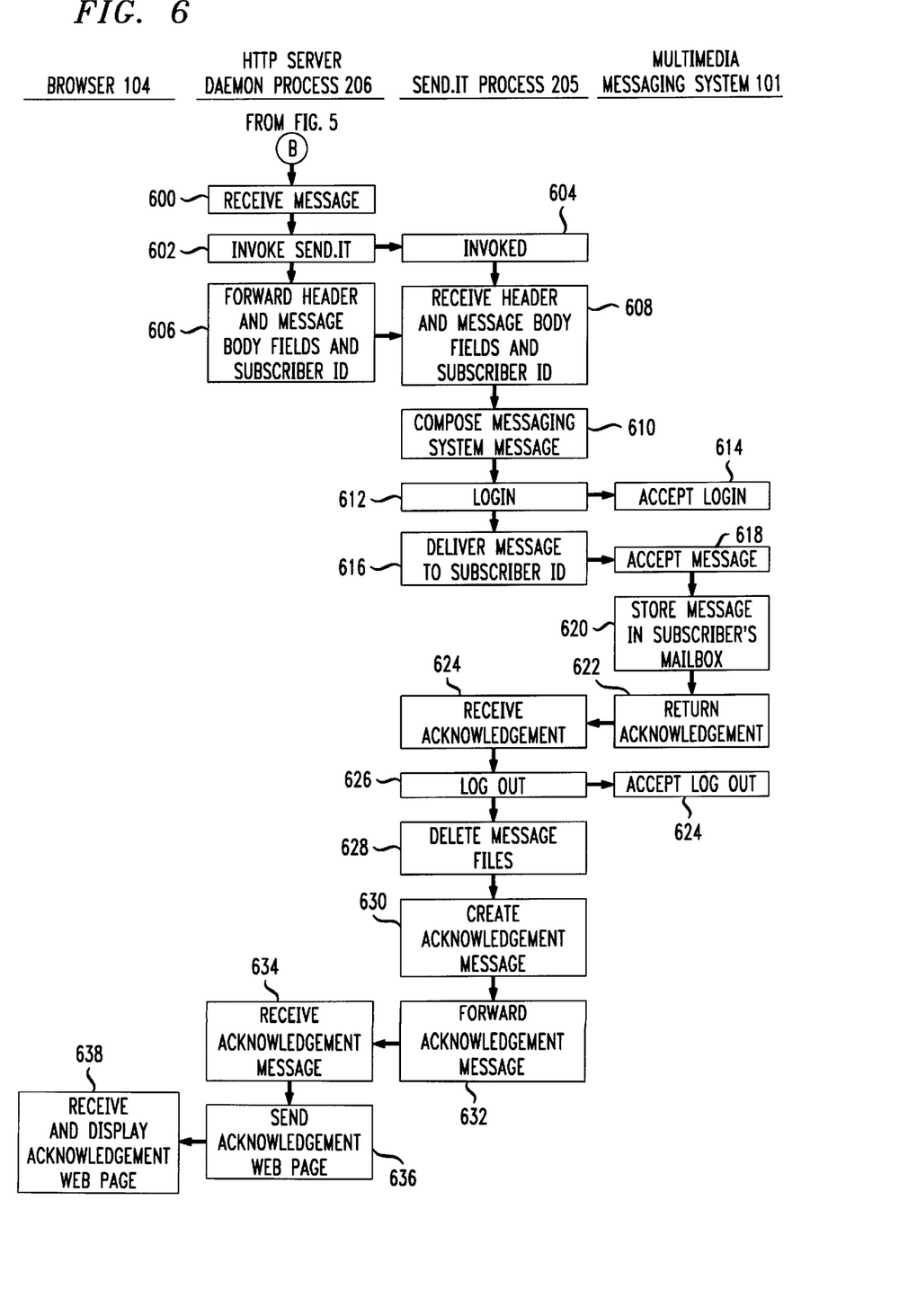

FIGS. 4–6 show the functions performed by multimedia messaging system 101 and entities associated with system 101 in cooperation with browser 104 of terminal 103 to provide a user of terminal 103 with a functionally-similar user interface to system 101 as system 101 provides to telephone callers. When the user of terminal 103 wishes to send a message via system 101, the user sends out a request via browser 104 over Internet/intranet 102 to location "http://<server address>/~<extension>" or to location "http://<server address>/~<name>", at step 400, where <server address>is the Internet/intranet domain name of HTTP server daemon process 206, and <extension> or <name> is the telephone number or surname of the intended message recipient. The sent-out request also includes the return Internet/intranet address (e.g., IP address and socket identification of the requesting browser) of requesting terminal 103. Daemon process 206 receives the request (a URL), at step 402, detects the "~" meta-character and in response it logs into system 101 through API 204, 208, at step 404, either as a special, mailbox-less, type of subscriber or as a conventional subscriber who is the owner of "Web Call Answer" mailbox 202. Conventional processes of system 101 accept the login, at step 406, and daemon process 206 forwards the received request through API 204, 208 to system 101, at step 408, as a directory lookup request to find the subscriber ID that corresponds to the received name or telephone extension. Conventional processes of system 101 receive the request, at step 410, and search subscriber directory 203 for the desired record, at step 412. If system 101 does not find a subscriber ID corresponding to the received name or extension, as determined at step 414, it returns a "no match" indication via API 204, 208 to daemon process 206, at step 416. In response to receipt of the "no match" indication, at step 418, daemon process 206 logs out of system 101, at step 420, and forwards the "no match" message via Internet/intranet 102 to terminal 103, at step 422. At terminal 103, browser 104 receives the message and displays it to the user, at step 424.

Returning to step 414, if a record matching the request is found, system 101 checks if it is a unique match, at step 430.

The match will be a unique match for a telephone extension, but may not be a unique match for a name. If the match is not unique, system 101 returns the subscriber names of all matching records, and a prompt to select one of them, via API 204, 208 to daemon process 206, at step 432. Upon receiving the matching names and prompt, at step 434, daemon process 206 forwards them along with a return Internet/intranet address of daemon process 206 via Internet/intranet 102 to the return address of terminal 103, at step 436. Browser 104 receives the matching names and prompt and displays them to the user, at step 438. When the user makes a selection of one of the names, browser 104 returns an indication of the selection to daemon process 206 via Internet/intranet 102, at step 440. Upon receiving the selection, at step 442, daemon process 206 forwards it via API 204, 208 to the return address of daemon process 206 at system 101, at step 444. Upon receipt of the selection, at step 446, or if a unique match had been found at step 430, conventional processes of system 101 return the subscriber ID of the selected matching subscriber to daemon process 206 via API 204, 208, at step 448.

Figure 7:
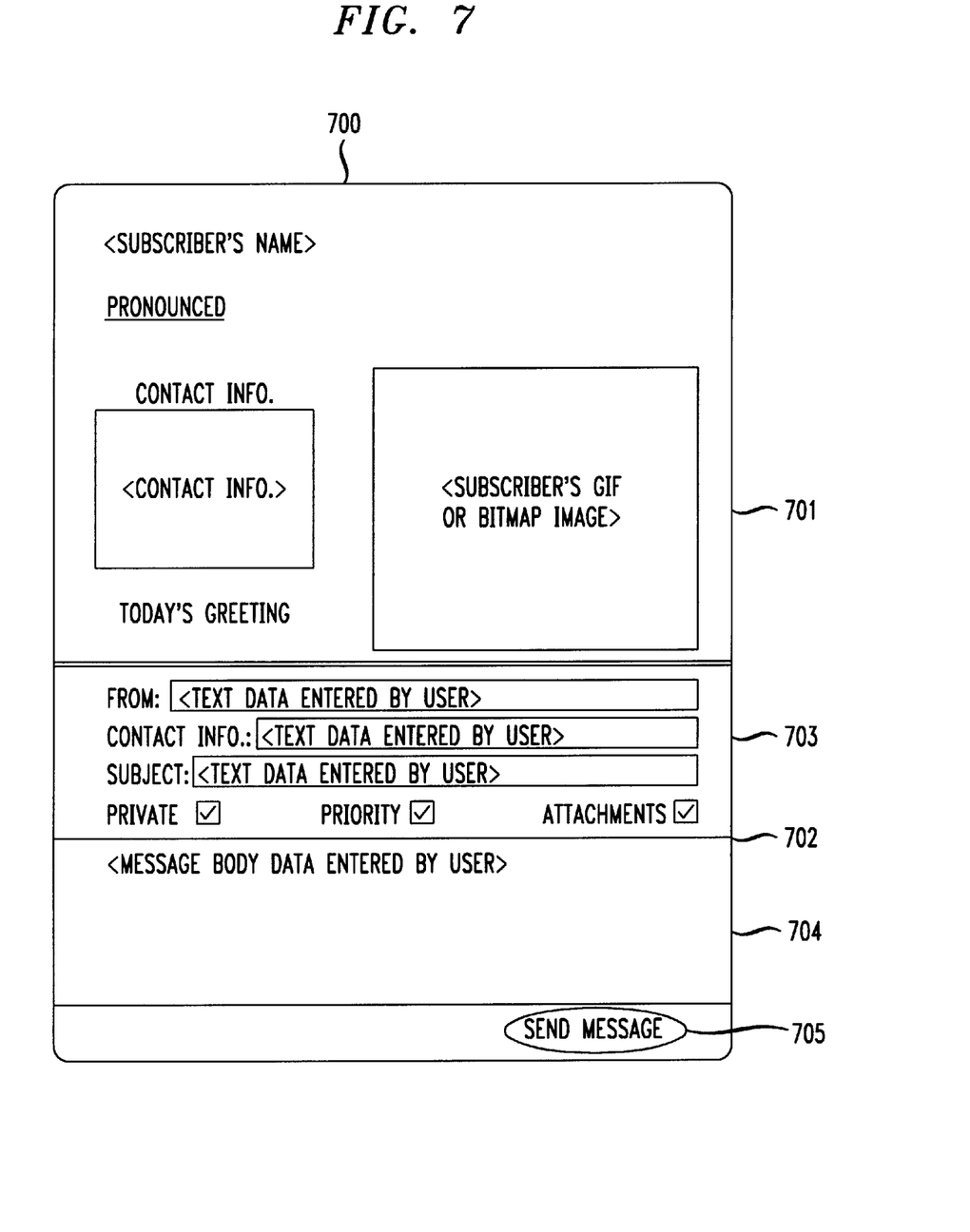
FIG. 7 is an illustration of a subscriber Web home page template of the multimedia messaging system of FIG. 1.

Turning now to FIG. 5, daemon process 206 receives the subscriber ID, at step 500, and in response requests the subscriber record for that subscriber ID from system 101, at step 502. Conventional processes of system 101 respond to receipt of the request, at step 504, by retrieving and returning the requested record, at step 506. Upon receipt of the record, at step 508, daemon process 206 logs out of system 101, at step 510, and then proceeds to dynamically generate a Web home page for the subscriber from the received record, at step 512. Illustratively, daemon process 206 creates the subscriber's home page by populating fields 701 of a generic Web home page template 700 (i.e., a form) with the subscriber's information, including the subscriber ID, from the received record. An example of such a generic Web home page template 700 is shown in FIG. 7. Alternatively, subscribers of messaging system 101 may be allowed to create and store, linked to their records in subscriber directory 203, their own custom Web home pages that are functionally equivalent to a populated page template 700, in which case daemon process 206 merely retrieves the identified subscriber's custom home page at steps 502–512. Daemon process 206 then uses the TCP/IP protocol to send the subscriber's home page over Internet/intranet 102 to the return address of terminal 103 which had sent the original request at step 400, at step 514, and then discards the subscriber's home page, at step 516. If and when it receives another request for that subscriber, daemon process 206 will again retrieve the subscriber's record and create the home page anew, thus ensuring that any changes that might have been made to the subscriber's record (e.g., a new active personal greeting) will be reflected in the newly-requested home page.

The subscriber's home page that was sent by system 101 at step 514 is received by browser 104 and is displayed to the user on the display of terminal 103, at step 520. If any of the fields of the home page (e.g., "Today's greeting") include audio information, displaying of the home page on terminal 103 may include an HTML anchor including the "~" meta-character for playback of the audio information to the user. When the user selects the anchor, the audio information is provided by the server via the "~" meta-character processing as described. To send a message back to the subscriber, the user fills out the message fields 702 of the displayed home page, at step 522. Typically, the fields filled out by the user are at least a header field 703 that indicates who the message is from, the subject of the message, the user's return address etc., and a message-body text field 704, as shown in FIG. 7.

When the user is done entering the message, he or she invokes a message-send function, illustratively by pointing to and clicking on a "SEND MESSAGE" virtual button 705 of the displayed home page, at step 524. The "SEND MESSAGE" button 705 is coded with the URL of a CGI script 207 which invokes the send-it process 205 of system 101. In response, browser 104 sends data files of the message fields 702 filled out by the user, the subscriber ID of the intended message recipient, and the return address of terminal 103, as a message to the URL of send-it process 205 at system 101 via Internet/intranet 102, at step 526.

Turning to FIG. 6, HTTP server daemon process 206 receives the message files at system 101, at step 600, and in response to the URL of send-it process 205 invokes send-it process 205 of system 101, at step 602. Upon invocation of send-it process 205, at step 604, daemon process 206 forwards the message files and the subscriber ID of the subscriber who is to receive the message, at step 606. Upon receipt of the message files and subscriber ID from daemon process 206, at step 608, send-it process 205 uses the received information to compose a message in the conventional format of system 101, at step 610. Send-it process 205 then logs into system 101, at step 612, and when system 101 accepts the login, at step 614, send-it process 205 delivers the message to system 101 addressed to the recipient subscriber's ID, at step 616. System 101 accepts the message, at step 618, and delivers it to mailbox 200 of the recipient subscriber, at step 620. System 101 then returns an acknowledgment of successful message delivery to send-it process 205, at step 622. In response to receipt of the acknowledgment, at step 624, send-it process 205 logs off of system 101, at step 626, and system 101 accepts and completes the log off, at step 628. Send-it process 205 then deletes the message files that it had received at step 608, at step 628, creates an acknowledgment message indicative of successful delivery of the message and addressed to the return address of terminal 103, at step 630, and forwards the acknowledgment message to daemon process 206, at step 632. Daemon process 206 responds to receipt of the acknowledgment message, at step 634, by sending a Web page containing the message via the TCP/IP protocol over Internet/intranet to terminal 103, at step 636. Terminal 103 receives the Web page and browser 104 displays it to the user/message sender on the display of terminal 103, at step 638. The acknowledgment message created at step 630 may be a negative acknowledgment, e.g., "This mailbox is full. Message unable to be delivered." The message sender is thus given substantially immediate confirmation of the delivery or non-delivery of his or her message.

Of course, various changes and modifications to the illustrative embodiment described above will be apparent to those skilled in the art. For example, protocols other than the Web may be employed to effect the same type of service. Of specific interest are the FTP protocol, which allows the simple transfer of files between computers, Telnet, which supports terminal emulation and login to host capabilities, and Chat, which is a very simple split-screen two-way typing application allowing two people to type at each other simultaneously. This provides the requisite infrastructure for text and binary file message delivery. An illustrative implementation for each of these protocols is outlined by the following steps:

For FTP:

1. Set up an FTP server with a directory for each extension having a corresponding enabled mailbox. Symbolically link a directory of the extension's corresponding username to the extension directory, to enable addressing of the extension directory by name. Allow changes in directory to find "enabled" mailboxes by naming the directories with the subscriber's name and/or telephone number/extension.

2. Put up a "read_me_first" file for visitors to the mailbox. This file contains the mailbox owner's name, the Active Greeting Annotation, and any other visual information that the subscriber wishes to display, and includes information about downloading the audio greeting in an appropriate voice format, and uploading files into the mailbox. (See below).

3. Use a daemon process to monitor the greeting information associated with a mailbox to extract information from the messaging system through an API and re-generate the appropriate "read_me_first" and greeting files in each directory. This daemon process is also responsible for monitoring the subscriber's FTP directory for new files, and effectuating delivery of uploaded files to the associated mailbox in the messaging system.

4. The daemon process uses the FTP login information as the originator information when delivering the file.

5. The message subject is the name of the delivered file.

6. A standard FTP copy operation allows the upload of multimedia files. Multimedia types and formats are indicated by conventional filename extensions, for example, .WAV, .TIF, .BMP, or .TXT.

7. The message is delivered using default delivery options, such as not-private, not-priority, etc.

8. It may be desirable to limit the size and number of files that an Internet caller may place in the mailbox during a single FTP session similarly to the way that telephone answering limits the caller to a single message per call, to ensure that a single session cannot seize all available mailbox space.

For Telnet:

1. Set up a Telnet server and set up a restricted login for visitors to the messaging system. The restricted login is set to accept a recipient's mailbox address by name or telephone number/extension, collect the caller's name and authentication handle (if offered), subject, and delivery options, and then execute a user-selected editor once and then drop the session.

2. On successful login, a text greeting is generated and displayed. The greeting information associated with a mailbox is extracted from the messaging system through a messaging API. The displayed greeting contains the mailbox owner's name, the Active Greeting Annotation, and any other visual information that the subscriber wishes to display.

3. The Telnet editor session is used to generate a text message. Operations on the Telnet client, such as cut and paste, are allowed.

4. When the editing session is complete, the contents of the edit buffer are delivered as a message.

5. It may be desirable to limit the size of the edit buffer in a Telnet session similarly to the way that telephone answer limits the caller to a single message per call, to ensure that a single session cannot seize all available mailbox space.

For Chat:

1. Set up a Chat server conforming to the Talk protocol for visitors to the messaging system.

2. Set up a daemon process to terminate the Talk protocol on behalf of enabled mailboxes. The user may be specified by mailbox address, by name, or by telephone number/extension.

3. On successful connection, a text greeting is generated and displayed. The greeting information associated with a mailbox is extracted from the messaging system through a messaging API. The displayed greeting contains the mailbox owner's name, the Active Greeting Annotation, and any other visual information that the subscriber wishes to display.

4. A series of two or more outbound messages prompts the caller to enter their name and authentication handle (if offered), and subject. The next two messages received are used on message delivery to populate these messaging fields.

5. The remainder of what is typed by the caller is captured and saved as text.

6. When the session is complete, the contents of the captured text are delivered as a message.

7. It may be desirable to limit the duration and size of the text-capturing function in a Chat session similarly to the way that telephone answering limits the caller to a single message per call, to ensure that a single session cannot seize all available mailbox space.

In all of the cases above, if the layout of the Web greeting page is done in standard HTML description format, then the FTP "read_me_first" file, the Chat outbound message, and the Telnet login message are just text-only renderings of this page.

Also, automatic capture of authentication information from Internet callers when they access the service may be included. For example, the IP address and server name of the originating terminal 103 may be identified in the "From:" field of the message. Or, subscribers of the messaging system may be allowed to create their own custom HTML greeting documents and install them on the messaging system as one of their valid personal greetings. Such greetings may include interactive capabilities, e.g., "Press one to get a map to my office; press two to automatically schedule a meeting with me.", etc. Such forms of greeting or call-handling can be represented as Web templates, described above. Such changes and modifications can be made without departing from the spirit and the scope of the invention and without diminishing its attendant advantages. It is therefore intended that such changes and modifications be covered by the following claims.

What is claimed is:

1. A method of messaging in a communications system comprising a user terminal and a messaging system interconnected by an Internet/intranet, comprising the steps of:

sending a request identifying a subscriber of the messaging system from the user terminal via the Internet/intranet to the messaging system;

in response to receipt of the request at the messaging system, sending subscriber information corresponding to the identified subscriber from the messaging system via the Internet/intranet to the terminal;

in response to receipt of the sent subscriber information at the terminal, presenting the sent subscriber information to a user of the terminal;

in response to the user providing message information at the terminal, sending the message information from the terminal via the Internet/intranet to the messaging system;

in response to receipt of the sent message information at the messaging system, composing the message information into a message of the messaging system; and storing the message in the messaging system in a mailbox of the identified subscriber.

2. The method of claim 1 further comprising the steps of:

in response to the storing, sending an acknowledgment of the message from the messaging system via the Internet/intranet to the terminal; and in response to receipt of the acknowledgment at the terminal, presenting the acknowledgment to the user.

3. The method of claim 1 wherein:

each sending of information via the Internet/intranet is effected by using at least one of the following protocols: HTTP, FTP, Telnet, and Chat.

4. The method of claim 1 wherein:

the subscriber information sent to the terminal includes a personal greeting of the subscriber.

5. The method of claim 1 wherein:

the subscriber information sent to the terminal includes a form for filling out by the user with the message information; and the step of sending the message information is performed in response to the user filling out the form with the message information.

6. An apparatus for performing the method of claim 1 or 2 or 3 or 4 or 5.

7. A method of messaging in a communications system comprising a user terminal that includes a Web browser and a multimedia messaging system, both interfaced to and interconnected by an Internet/intranet, comprising the steps of:

in response to a prompt from a user of the terminal, the Web browser sending from the terminal a request addressed to an Internet/intranet address of the messaging system and identifying by at least one of name and telephone number a subscriber of the messaging system, and including an Internet/intranet address of the terminal;

In response to receipt of the request at the messaging system, determining a subscriber identifier of the subscriber within the messaging system;

in response to a determination of the subscriber identifier, retrieving stored subscriber information associated with the subscriber identifier from the messaging system;

in response to the retrieval, composing a Web home page for the subscriber from the retrieved subscriber information, the Web home page including a return address of the messaging system, the subscriber identifier of the subscriber, and space for message information from the user;

in response to the composing, sending the subscriber's Web page addressed to the Internet/intranet address of the terminal;

in response to receipt of the subscriber's Web page at the terminal, the Web browser presenting the subscriber's Web page to the user;

in response to receiving message information from the user in said space in the Web page and a prompt from the user, the Web browser sending from the terminal the message information, subscriber identifier of the subscriber, and the Internet/intranet address of the terminal, addressed to the return address of the messaging system;

in response to receipt of the message information at the messaging system, formatting the messaging information into a message of the messaging system; and in response to receipt of the subscriber identifier of the subscriber at the messaging system, storing the message in a mailbox of the subscriber in the messaging system.

8. The method of claim 7 further comprising the steps of:

in response to the storing, sending an acknowledgment thereof from the messaging system addressed to the address of the terminal; and in response to receipt of the acknowledgment at the terminal, the Web browser presenting the acknowledgment to the user.

9. The method of claim 7 further comprising the step of:

after sending the subscriber's Web page, deleting the subscriber's Web page from the messaging system, so that receipt of another request at the messaging system identifying same said subscriber will result in composing anew a Web home page for the subscriber, whereby changes made to the stored subscriber information inbetween the receipt of the requests is reflected in the Web home page that is composed anew.

10. The method of claim 7 wherein:

each sending via the Internet/intranet is effected by using an HTTP protocol.

11. An apparatus for performing the method of claim 7 or 8 or 9 or 10.

* * * * *